United States Patent [19]

Ogasawara et al.

[11] Patent Number: 4,767,184
[45] Date of Patent: Aug. 30, 1988

[54] WATERPROOF OPTICAL CABLE

[75] Inventors: Ichiro Ogasawara; Nobumasa Nirasawa; Akira Nishimura, all of Kanagawa, Japan

[73] Assignee: Sumitomo Electric Industries, Ltd., Osaka, Japan

[21] Appl. No.: 35,424

[22] Filed: Apr. 7, 1987

[30] Foreign Application Priority Data

Apr. 21, 1986 [JP] Japan ................... 61-92514

[51] Int. Cl.[4] ............. G02B 6/44; H02G 15/20
[52] U.S. Cl. ................. 350/96.23; 174/23 R; 174/70 R
[58] Field of Search ............ 350/96.23; 174/70 R, 174/70 S, 23 R, 23 C

[56] References Cited

U.S. PATENT DOCUMENTS

| | | | |
|---|---|---|---|
| 3,944,717 | 3/1976 | Hacker et al. | 174/23 C |
| 4,002,819 | 1/1977 | Woytiuk | 174/107 X |
| 4,123,137 | 10/1978 | Marcatilli | 350/96.21 |
| 4,401,366 | 8/1983 | Hope | 350/96.23 |
| 4,596,443 | 6/1986 | Diemeer et al. | 350/96.23 |
| 4,701,015 | 10/1987 | Saito et al. | 350/96.23 |
| 4,703,998 | 11/1987 | Uchioke et al. | 350/96.23 |
| 4,711,523 | 12/1987 | Iri et al. | 350/96.23 |
| 4,717,236 | 1/1988 | Dewing | 350/96.23 |
| 4,720,164 | 1/1988 | Oestreich | 350/96.23 |

FOREIGN PATENT DOCUMENTS

| | | | |
|---|---|---|---|
| 0159575 | 10/1985 | European Pat. Off. | 350/96.23 |
| DEA2507583 | 2/1976 | Fed. Rep. of Germany | 350/96.23 |
| 3118172 | 11/1982 | Fed. Rep. of Germany | 350/96.23 |
| 61-34512 | 2/1986 | Japan | 350/96.23 |
| 61-53612 | 3/1986 | Japan | 350/96.23 |
| 61-73113 | 4/1986 | Japan | 350/96.23 |
| GBA2122767 | 1/1984 | United Kingdom | 350/96.23 |
| GBA2157848 | 10/1985 | United Kingdom | 350/96.23 |

OTHER PUBLICATIONS

Patent Abstract of Japan, vol. 8, No. 97 (P-272) (1534), 8th May 1984 &, JP-A-59 9608 (Furukawa Denki Kogyo), 19-01-1984.

*Primary Examiner*—William L. Sikes
*Assistant Examiner*—Brian M. Healy
*Attorney, Agent, or Firm*—Sughrue, Mion, Zinn, Macpeak, and Seas

[57] ABSTRACT

An optical fiber cable in which plural optical fibers are joined in a flat assembly. Each assembly is coated with a water-swelling resin, stacked with other such flat assemblies and fitted in a spiral groove of a spacer. A tape is wound around the so-fitted spacer.

6 Claims, 1 Drawing Sheet

WATERPROOF OPTICAL CABLE

BACKGROUND OF THE INVENTION

1. Field of the Invention

The present invention relates to a waterproof optical cable having a water containment function to prevent water from spreading in the cable when water enters the cable due to the damage to the sheath of the cable. The present invention also relates to a method of manufacturing the waterproof optical cable.

2. Background of the Invention

A conventional optical cable is provided with a water containment function by continuously or intermittently filling the cable with a waterproofing compound (jelly) such as a petrolatum-group jelly, an oily compound jelly and a polybutene group jelly or with a water-swelling material such as a water-absorbing string, jute, powder and tape. However, as for a spacer-type optical cable having optical fibers or flat optical conductors in the spiral grooves of the peripheral surface of a rodlike spacer, the gap in each of the grooves is so narrow that it is difficult to fill the water-swelling material into the groove. For that reason, the liquid waterproofing compound is generally filled into the groove. Since the gap is made very small in order to prevent the irregularity of the disposition of the optical conductors fitted in the groove and it is extremely difficult to interpose the water-swelling material between the flat optical conductors, the waterproofing compound is fitted in the cable to prevent the spread of water therein, even though the efficiency or ease of manufacturing and connection of the cable is sacrificed. Such an approach is described in the Japanese Patent Application No. 193627/85.

As for the conventional optical cable filled with the water-proofing compound, the temperature and pressure of the compound are made high enough to enhance its flowing property and to perfectly fill the compound in the cable when it is manufactured. At that time, heat and pressure are likely to adversely affect the properties of the optical fiber of the cable. Besides, some difficulty is caused in the manufacturing. Since the compound has a high viscosity and feels unpleasant in the manufacturing of the cable, the efficiency or ease of the work is low. Since the compound clings to the optical fiber, the compound needs to be completely removed from the fiber before the fiber is connected. Therefore, the efficiency or ease of the connection work is very low.

A related U.S. patent application has been filed as Ser. No. 708,769, filed on Mar. 5, 1985, now U.S. Pat. No. 4,703,998, issued 11/3/87.

SUMMARY OF THE INVENTION

Accordingly, an object of this invention is to provide a waterproof optical fiber which can be easily fabricated.

In the present invention, a waterproof optical cable is provided with a coating resin film layer containing a water-swelling material. This resin film is coated on the surface of each of flat optical conductors fitted in the spiral grooves of the peripheral surface of a rodlike spacer and functions to prevent water from spreading between the flat optical conductors. The invention also includes a method of manufacturing the waterproof optical cable.

The present invention is characterized in that in order to solve the above-described problem, a coating resin film layer containing a water-swelling material is provided on the surface of a flat optical conductor.

Since the coated resin film layer containing the water-swelling material is provided on the surface of the flat optical conductor in accordance with the present invention, a waterproofing compound does not need to be caused to cling to the conductor. Therefore, the efficiency or ease of the manufacturing and connection of the conductor is high and water is prevented from spreading between the conductors.

DETAILED DESCRIPTION OF THE PREFERRED EMBODIMENTS

Embodiments of the present invention are hereafter described with reference to the drawings attached hereto.

Figure 1:
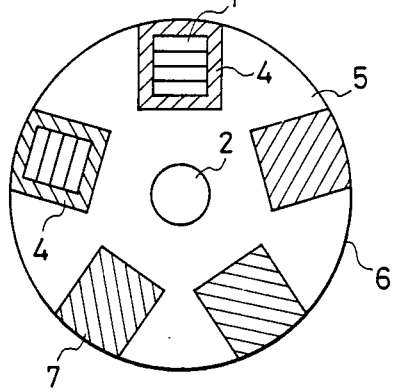
FIG. 1 shows a sectional view of an optical fiber unit provided in accordance with the present invention.

FIG. 1 shows a sectional view of an optical fiber unit provided in accordance with the present invention. The unit comprises multi-fiber flat optical conductors 1, a tension-resisting member 2, a water absorbent 4 filled in the grooves of a PE (polyethylene) spacer 5, in which the conductors 1 are fitted, a wound tape 6 holding the conductors 1 and a water absorbent 7 filled in the empty grooves of the PE spacer 5.

Figure 2:
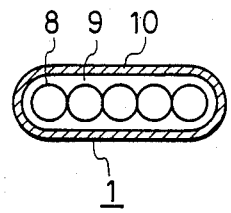
FIG. 2 shows a sectional view of a five-fiber flat optical conductor provided in accordance with the present invention.

FIG. 2 shows a sectional view of an example of the multi-fiber flat optical conductor 1 fitted in the groove of the PE spacer 5. The example is a five-fiber flat optical conductor 1 in which five optical fibers 8 are juxtaposed together in a plane and are coated with a coating material 9. A coating resin film layer 10 containing a water-swelling material is provided on the peripheral surface of the coating material 9.

Figure 6:
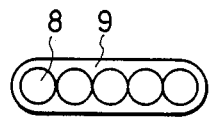
FIG. 6 shows a sectional view of a conventional five-fiber flat optical conductor.

FIG. 6 shows a sectional view of a conventional five-fiber flat optical conductor to be compared with the conductor 1 shown in FIG. 2. The same symbols in FIGS. 2 and 6 denote the same portions. It is understood through the comparison that the multi-fiber flat optical conductor 1 provided in accordance with the present invention is characterized in that the coating resin film layer 10 containing the waterproofing water-swelling material is provided on the peripheral surface of the conductor 1 having the same constitution as the conventional conductor.

The water-swelling material is a high-water-absorption polymer such as a cross-linked polyacrylate, a graft copolymer of starch and acrylic acid, a graft copolymer of starch and acrylonitrile, a copolymer of vinyl acetate and an acrylate, a copolymer of isobutylene and a maleic anhydride, a copolymer of polyvinyl alcohol and a maleic anhydride, a cross-linked CMC (carboxymethylcellulose) or the like. It is preferably that the ratio of the water absorption of the water-swelling material is about 50 to 1,000.

The coating resin film layer 10 is made of a polyvinyl alcohol resin, an ethylene and vinyl acetate resin, a polyurethane resin, a polyamide resin, a polyacrylic resin, a polyester resin or the like. It is preferable that the resin film layer 10 is made of a highly hydrophilic resin in order to increase the speed of the water absorption of the water-swelling material and to stop the spread of water as soon as possible. It is especially preferable that the layer 10 is made of a polyvinyl alcohol resin or a partially saponified ethylene and vinyl acetate resin, which can be water-swelled itself.

In one of several methods of providing the coating resin film layer 10 on the flat optical conductor 1, the above-mentioned resin is dissolved in a solvent to prepare a solution. The water-swelling material is uniformly dispersed and mixed in the solution. The mixture is then applied to the surface of the conductor 1. In another one of the methods, the resin and the water-swelling material are mixed together in a powdery or granular form, the resin is then fused, and the mixture is thereafter applied to the surface of the conductor 1.

If the water-swelling material is capable of making a coating film whose form is not much broken when the material absorbs water, the resin film layer 10 may be made of only the water-swelling material. One such water-swelling material is a cross-linked denatured polyvinyl alcohol such as a copolymer of polyvinyl alcohol and a maleic anhydride, which is produced by esterifying a number of the hydroxyl groups of the polyvinyl alcohol with a cylcic acid anhydride or the like to introduce a carboxyl group and a cross link to the side chain of the polyvinyl alcohol.

Figure 3:
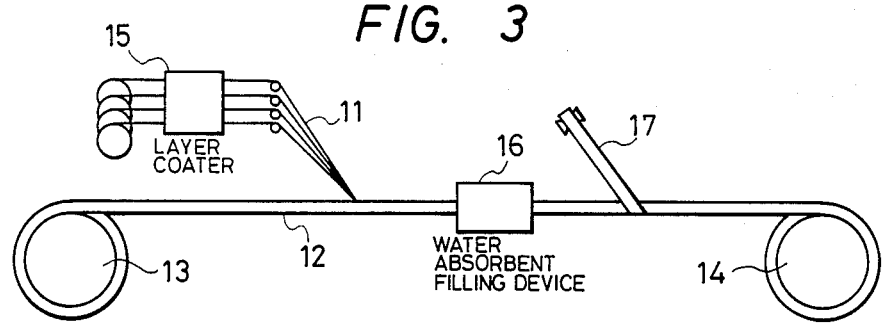
FIG. 3 shows a waterproof optical cable manufacturing method which is an embodiment of the present invention.

The coating resin film layer 10 containing the water-swelling material is provided on the flat optical conductor 1 either in a process of manufacturing the conductor or in a continuous manufacturing process wherein the layer containing the water-swelling material is provided by a device 15, shown in FIG. 3, while a plurality of flat optical conductors 11 are stacked together and fitted in a spacer 12 supplied from a spacer feed bobbin 13. At that time, the coating resin film layer 10 containing the water-swelling material may be provided only one side of the flat optical conductor 11.

Since the coating resin film layer 10 containing the water-swelling material is provided on the peripheral surface of the flat optical conductor, it is not necessary to fill a waterproofing compound or a water absorbent in between the conductors stacked together and fitted in a groove.

The application device of FIG. 3 also includes a winding bobbin 14, a water-absorbent filling device 16 and a holding wound tape 17.

If the water absorbent 4, which is filled in the grooves of the PE spacer 5 in which assemblies of the multi-fiber flat optical conductors 1 are fitted as shown in FIG. 1, is powdery, it is easy for the water absorbent filling device 16 to fill the water absorbent in the grooves.

If the assemblies of the multi-fiber optical conductors 1 are fitted in the grooves as described above, a tapelike water absorbent may be used instead of a powdery water absorbent. If the coating resin film layer containing the water-swelling material is provided on the spacer before the assemblies of the multi-fiber flat optical conductors 1 are fitted in the grooves, no water absorbent needs to be filled in the grooves. These cases are included within the present invention.

It is necessary to fill a water-absorbing powder or string of the water absorbent 7 in each empty groove in which the assembly of the multi-fiber flat optical conductors 1 is not fitted, as shown in FIG. 1.

The optical fiber unit or cable shown in FIG. 1 is provided with the above-described constitution so as to be of the water containment type, without using a material such as a water-proofing compound which lowers the efficiency or ease of the manufacturing or connection of the optical fiber unit or cable. The wound tape 6 holding the conductor 10 is made of a water-absorbing material.

A waterproof optical cable is manufactured by providing an LAP (laminated aluminum polyethylene) sheath, a PE sheath, a PVC (polyvinyl chloride) sheath or the like or the peripheral surface of the optical fiber unit constructed in accordance with the present invention as shown in FIG. 1. It is preferable that the rought winding of a water-absorbing string on the peripheral surface of the spacer or the filling of a water-absorbing powder thereon is performed in order to make the waterproofness between the spacer and the sheath perfect when the sheath is provided on the optical fiber unit.

Figure 4:
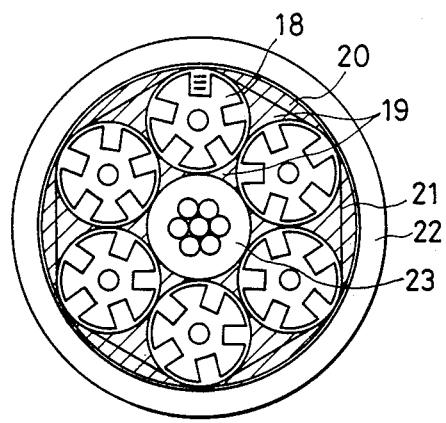
FIG. 4 shows a sectional view of a multi-fiber optical cable which is another embodiment of the present invention.

FIG. 4 shows a sectional view of a multi-fiber optical cable which is one of the embodiments. The cable has a plurality of optical fiber units 18, each of which is constructed as shown in FIG. 1. A water absorbent or a water proofing compound 19 is filled in between the optical fiber units 18. The waterproof multi-fiber optical cable can thus be easily manufactured.

A water-absorbing material or a waterproofing compound 20 is filled in between a holding wound tape 21 and a sheath 22 when the sheath is provided around the holding wound tape 21 wound on the assembled optical fiber units 18. A PE-coated tension-resisting member 23 is located at the center.

Even if the waterproofing compound 19 is filled in between the optical fiber units on the ground that the water absorbent is more expensive than the waterproofing compound, the compound does not cling to the flat optical conductors of the multi-fiber optical cable. For that reason, the efficiency or ease of connection of the cable is much higher than for a conventional optical fiber cable having a waterproofing compound filled in the optical fiber units of the cable.

An actual specific embodiment of the present invention is hereafter described. Fifty grams of a powder of a partially saponified ethylene and viyl acetate resin powder was dissolved in a solvent of toluene and ethyl acetate so that a solution was prepared. One-hundred fifty grams of a fine powder of a cross-linked polysodium acrylate was then added to the solution. They were stirred together. The solution was thereafter applied to the peripheral surface of a flat optical conductor. An optical fiber unit having a constitution as shown in FIG. 1 was made of a conductors whose peripheral surfaces were coated with the solution. A water-absorbing powder was filled as a water absorbent in the grooves of a spacer, in which the flat optical conductors were fitted. Water-absorbing strings were fitted as a water absorbent in the empty grooves of the spacer. A water-absorbing string was roughly wound on a holding wound tape. A PE sheath was provided around the tape and the strings so that a waterproof optical cable was constructed.

Figure 5:
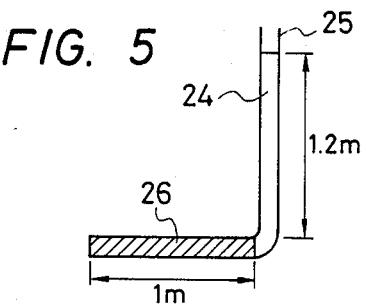
FIG. 5 shows a view describing a waterproofness test.

A waterproofness test was conducted on the waterproof optical cable in a test, whose principle is described in FIG. 5, in order to evaluate the waterproofness of the cable. In the test, ten samples 26 each having a length of 1 m were made from the cable. Each of the samples of the optcial cable 26 was horizontally inserted into the lower end of a nylon pipe 25 bent at an angle of 90°. Water 24 was poured into the nylon pipe 25 through its upper end so that a water column of 1.2 m in height acted on the sample 26. After 24 hours, it was checked whether or not the water oozed from the inserted end of the sample. It turned out that the water did not ooze at the inserted end of any of the samples 26.

According to the present invention, a coating resin film layer containing a water-swelled material is provided on the surface of each of flat optical conductors fitted in the spiral grooves of the peripheral surface of a rodlike spacer, so that a waterproof optical cable is constructed. As a result, good effects are produced as follows:

(1) Since it is not necessary to fill a waterproofing compound or a water absorbent in between the flat optical conductors, the efficiency or ease of manufacturing of the waterproof optical cable is enhanced.

(2) Since an adhesive material such as the waterproofing compound does not cling to the flat optical conductors, the efficiency or ease of connection of the conductors is high.

(3) Since the waterproofing compound, which would harden at a low temperature to minutely bend each optical fiber of the waterproof optical cable and would need to be filled at a high temperature harmful to the optical fiber in manufacturing the cable, is not used for the cable, the optical fiber is not at all adversely affected by the waterproofing compound.

What is claimed is:

1. A waterproof optical cable, comprising:
   a rodlike spacer having a plurality of spiral grooves on its peripheral surface;
   stacks fitted into at least some of said grooves, each stack comprising a plurality of substantially flat optical conductors stacked together in a radial direction of said spacer and coating resin film layer containing a water swelling material coated on a surface of each of said optical conductors; and
   a water absorbent filling any of said grooves not fitted with one of said stacks.

2. A waterproof optical cable as recited in claim 1, wherein said coating resin film layer is provided on only one of plural principal surfaces of said flat optical conductors.

3. A waterproof optical cable as recited in claim 1, wherein said coating resin film layer surrounds all exterior surfaces of said flat optical conductors.

4. A waterproof optical cable as recited in claim 1, wherein each of said flat optical conductors comprises a plurality of optical fibers joined together.

5. A waterproof optical cable as recited in claim 1, further comprising a water absorbent filling said grooves between said stacks and said spacer.

6. A waterproof optical cable as recited in claim 1, comprising a plurality of said spacers each having said stacks;
   a wound tape surrounding said plurality of said spacers;
   a first waterproofing material filling space among said spacers, and between said spacers and said wound tape;
   a sheath surrounding said wound tape; and
   second waterproofing material between said sheath and said wound tape.

* * * * *